Oct. 17, 1933.　　　G. M. FORD ET AL　　　1,930,875
PROCESS OF REMOVING HYDROGEN SULPHIDE FROM GASES
Filed Oct. 6, 1930　　2 Sheets-Sheet 1
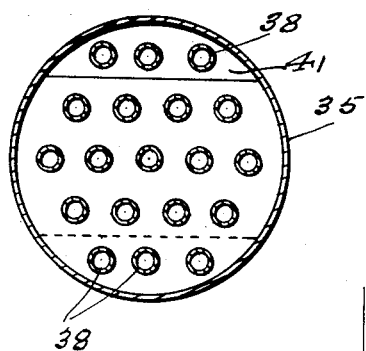
Fig. 8.
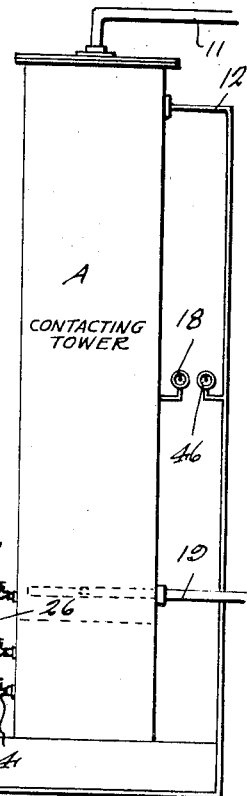
Fig. 1.
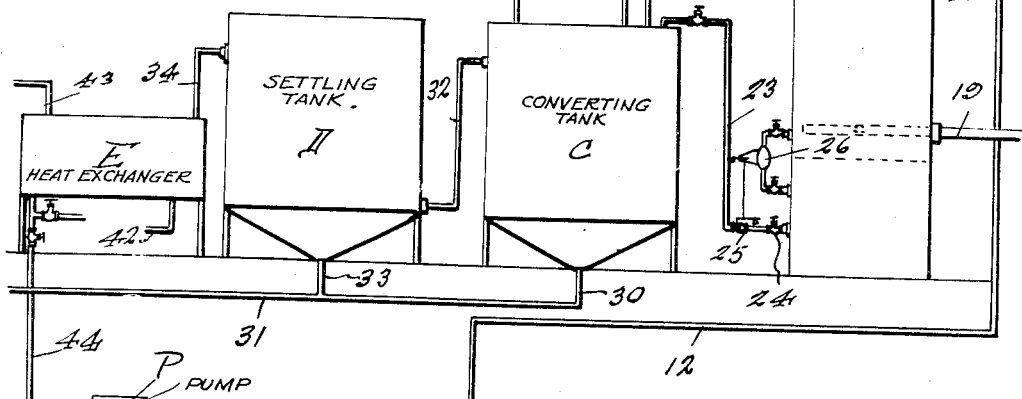
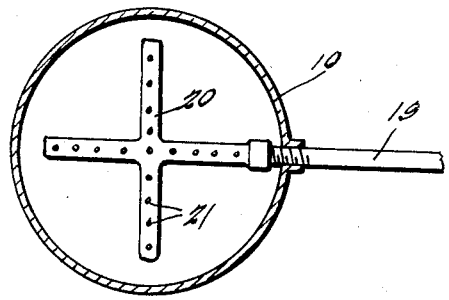
Fig. 4.
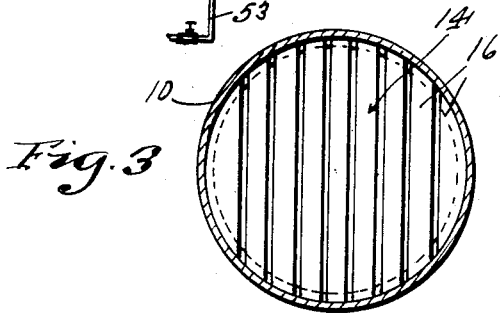
Fig. 3.
Inventor
Grover M. Ford
Otto H. Schoenwald
By Clarence A. O'Brien
Attorney

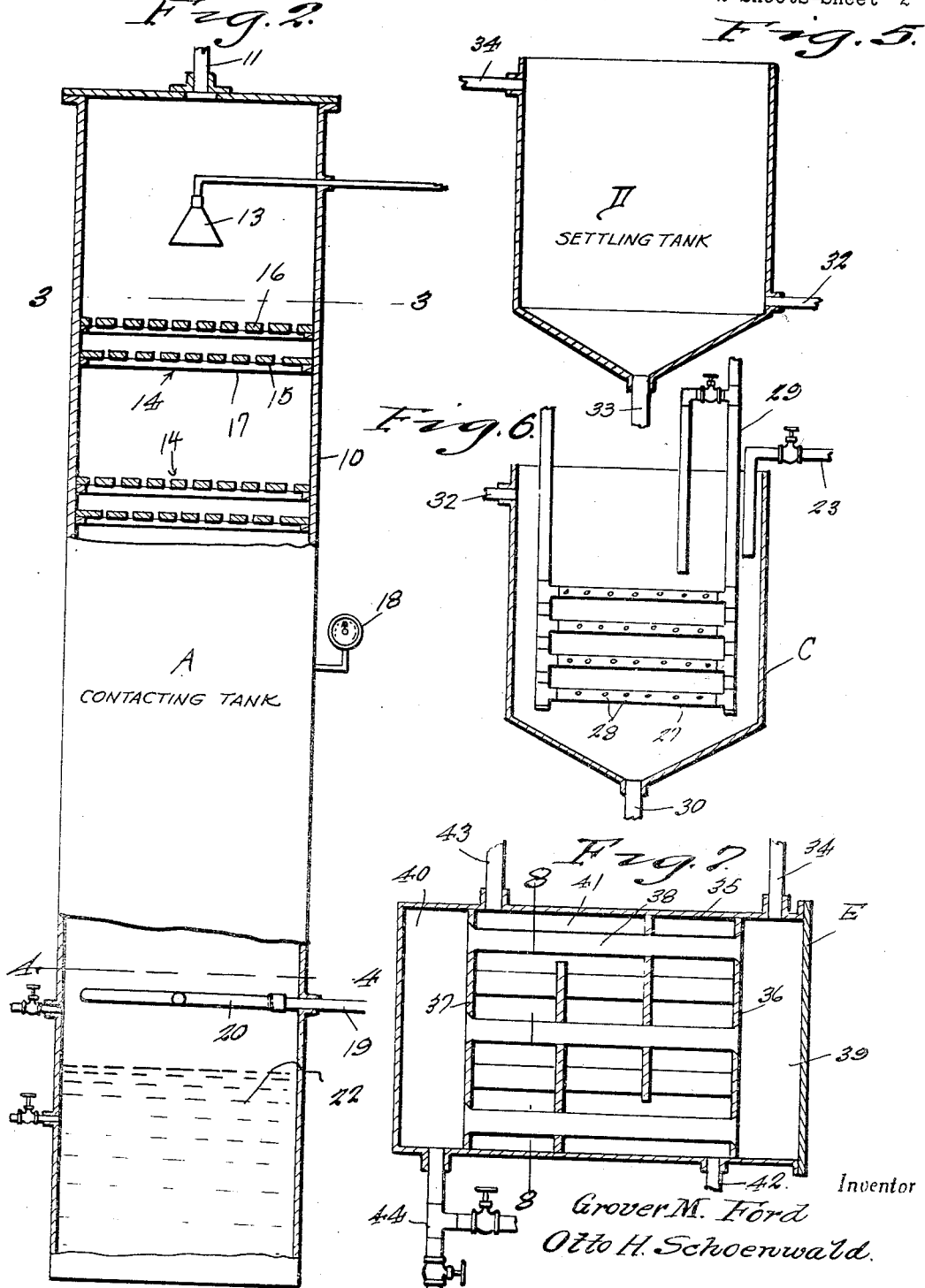

Patented Oct. 17, 1933

1,930,875

UNITED STATES PATENT OFFICE 1,930,875

PROCESS OF REMOVING HYDROGEN SULPHIDE FROM GASES

Grover M. Ford and Otto H. Schoenwald, Ponca City, Okla.

Application October 6, 1930. Serial No. 486,789

1 Claim. (Cl. 23—3)

This invention relates to a process of removing hydrogen sulphide from gases, particularly from natural gas.

One of the objects of the invention is to provide a treating solution containing an unusually great amount of calcium hydroxide whereby the removal of hydrogen sulphide from the gas with ease and dispatch is facilitated.

Another object of the present invention is to provide for the conversion of the product of the reaction between the gas being treated and treating solution, to treating solution, whereby the treating solution may be re-used in a continuous cycle without requiring much activation.

Another object of the invention is to subject the product of the reaction between the gas being treated and the treating solution, to atmospheric oxygen while forcing steam therethrough, so as to liberate the free sulphur therefrom and cause and accelerate conversion of the calcium hydrosulphide therein to calcium hydroxide.

Further objects of the invention are to provide a process of the character referred to that is very simple in its operation, thoroughly reliable for its intended purpose, and comparatively inexpensive to carry out.

The nature of the invention and the composition and arrangement and combination of parts of the apparatus employed, and the sequence and duration of steps and operations involved in the process to be carried out in the apparatus will be readily understood from the following descriptions and explanations and the drawings.

In the drawings wherein like reference characters denote corresponding parts throughout the several views:—

Figure 1 is a diagrammatic side elevational view of one form of apparatus for carrying out the process of our invention.

Fig. 2 is an enlarged side elevational view partly in section of the contact tower, Fig. 3 is a horizontal sectional view taken approximately on the line 3—3 of Fig. 2 looking downwardly.

Fig. 4 is a horizontal sectional view taken approximately on the line 4—4 of Fig. 2 looking downwardly.

Fig. 5 is a transverse vertical sectional view through the settling tank.

Fig. 6 is a transverse vertical sectional view through the conversion tank.

Fig. 7 is a vertical longitudinal sectional view through the heat exchanger, and Fig. 8 is a vertical transverse sectional view taken approximately on the line 8—8 of Fig. 7.

The apparatus shown for carrying out the process of the invention comprises a contact tower A which consists of a vertical cylindrical closed drum 10 having a gas outlet pipe 11 leading from its top for releasing therefrom the natural gas or other gases treated therein. Extending through the side of drum 10 near the top is the activating solution inlet pipe 12 which has on its inner end a downwardly directed spray nozzle 13. Below the spray nozzle 13 in the drum are pairs of vertically spaced baffles indicated generally at 14.

The pairs of baffles 14 consist of a lower element of chordally disposed, spaced slats 15 spaced below an upper element consisting of similar spaced slats 16 in such a way that the slats of the lower element cover the spaces of the upper element. The ends of the slats are secured to rings 17 which may be welded to the wall of the drum 10. Intermediate the ends of drum 10 is an exterior pressure gauge 18 to indicate the pressures within the drum.

The gas to be treated is entered into the drum through an inlet which enters the drum at a point below the lowermost of the pairs of baffles 14 and spaced upwardly from the lower end of the drum. This inlet comprises a pipe 19 which feeds a cruciform tubular head 20 within the drum. The branches of head 20 have openings 21 therein which discharge the gas to be treated to be directed upwardly against the baffles 14 and counter-current to the descending activated treating solution discharged from the nozzle 13.

The product of the reaction between the gas and the treating solution collects in the bottom of drum 10 as indicated at 22 and flows from the drum through the pipe 23, having therein a hand valve 24 and a lever valve 25 to control the flow therethrough of the liquid reaction product. The lever valve 25 may be arranged to be controlled so that it will open and permit flow therethrough of the liquid reaction product only when the same has reached a certain level in the lower part of the drum. There is also a gauge glass 26 on the bottom of drum 10 to indicate the height of the liquid reaction in the drum.

An open conversion tank C receives the liquid reaction product from the pipe 23. In this conversion tank is a steam heating element 27 the pipes of which are provided with openings 28 which permit steam to escape into liquid reaction product in the tank, and cause conversion of the calcium hydrosulphide in the liquid to calcium hydroxide as will be more fully explained.

The steam enters the heating element through the steam supply line 29. Leading from the bottom of tank C is a pipe 30 which carries settlings and sludge to the drain pipe 31. From one side near the top of the conversion tank C leads a pipe 32 which conveys the converted liquid from the tank C and empties into the bottom of an open settling tank D.

From the bottom of the settling tank D depends a pipe 33 which conveys settlings and sludge to the drain pipe 31. Leading from one side of the settling tank D near its top is a pipe 34, for conveying the cleared liquid therein to the heat exchanger E into the top of which the pipe 34 leads.

The heat exchanger consists of a horizontally disposed closed drum 35 having bulk heads 36, 37 near either end and between which are carried a plurality of spaced tubes 38 which communicate with the chambers 39, 40 of the interior of the drum defined by the heads 36, 37. Cooling water is introduced into the space 41 between the bulk heads so as to contact and cool the tubes 38 and the liquid therein. The water is withdrawn through the discharge pipe 43. The liquid reaction product is introduced into the heat exchanger by passing it by means of the pipe 34 into the chamber 39. The liquid then flows through tubes 38 in heat exchange relation with the water in chamber 41 to the other chamber 40 whence it passes from the heat exchanger E through the pipe 44.

The pipe 44 is led to the intake side of a pump P. To the side of the pump is connected a pipe 44 which is connected so as to discharge eventually into the reaction chamber A. The pump can be regulated to return the rejuvenated treating fluid to the reaction chamber at any desired pressure, a pressure gauge 46 being placed in the line to aid in the regulation thereof. The pipe 45 from the discharge side of the pump is connected to the pipe 12 leading directly into the reaction chamber A. A hand valve 47 is placed in the pipe 45 in advance of its connection with the pipe 12.

In advance of the hand valve 47 there is connected to the pipe 45 a branch pipe 48. At a point beyond the hand valve 47 another branch pipe 49 is connected to the pipe 45. Arranged between these branch pipes are the activating tanks F, F arranged so that one of the activating tanks may be maintained in operation while the other is cut out for rejuvenation or other purposes. These activating tanks are horizontal drums which have a valved connection 50 at one end connected to the branch 48 and a valved connection 51 at the other end connected to the branch pipe 49. In each of the activating tanks F there is a manhole 52 which may be opened for replenishing the treating liquid therein and for other purposes. A valved drain pipe 53 leads from the bottom of each activating tank for draining the liquid therefrom.

It is well known that hydrogen sulphide in gases will be removed upon contact with a solution of calcium hydroxide, and be thereby removed from the gas. However, a serious objection to the employment of calcium hydroxide solutions for this purpose has been the relative insolubility of calcium hydroxide in water, a condition which requires the employment of relatively enormous quantities of water which are difficult to handle and bring into proper relation to the gas. In order to overcome this objection to the use of a calcium hydroxide solution and reduce the volume thereof, while rendering the same more active and efficient, I provide means for greatly increasing the amount of calcium hydroxide which may be placed in solution and contacted with the gas to be purified. The means stated comprises dissolving the calcium hydroxide in a solution of calcium chloride or of similar salt solution instead of in pure water. The solubility of the calcium hydroxide in such a salt solution is found to depend upon the concentration of the salt solution. It has been found that an aqueous solution containing from 8% to 12% by weight of sodium chloride will dissolve .18% of calcium hydroxide at a temperature of approximately 80 degrees F. The activating tanks F are filled with a calcium hydroxide and salt solution of that composition, constituting the activating liquid of the invention.

When operation of the apparatus of the invention is to be started, the activating liquid is pumped from either one of the activating tanks into the contact tower A through the pipe 12 at a pressure which is slightly greater than that at which the incoming raw gas enters by the pipe 19, so that the pressure within the tower will always be at least equal to or slightly greater than the pressure of the incoming treating liquid. It is to be understood that the particular pressure used will be dependent on the character of the gas to be treated. The process operates equally well on high or low pressures if a condition of substantial equilibrium be maintained within the tower A between the pressure of the incoming treating liquid and the pressure of the incoming raw gas.

The raw natural gas, or other gas to be treated passes upwardly from the head 20 within contact tower A, and pursues a circuitous course through the baffles 14 and counter-current to the spray of the treating liquid descending from the spray nozzle 13. When the hydrogen sulphide in the gas comes into contact with the treating liquid the following reaction takes place:

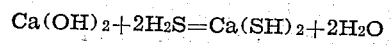
$$Ca(OH)_2 + 2H_2S = Ca(SH)_2 + 2H_2O$$

As already stated, the liquid reaction product collects in the bottom of the contact tower A, while the treated gas, bereft of hydrogen sulphide, passes out at the top of the tower through the pipe 11. The reaction product liquid is then passed in the manner described to the converting tank C. The liquid reaction product is a solution of water and calcium hydro-sulphide.

In order to reduce the cost of carrying on the process, it is proposed to condition the liquid reaction product for use again as treating fluid in the tower A. To this end, we propose to convert part of the calcium hydrosulphide of the reaction product to calcium hydroxide by the use of the converting tank C and settling tank D. In converting the tank C, the steam already described as issuing from the steam heated element 27 is permitted to percolate through the reaction product liquid so as to maintain it at a continuous temperature of approximately 180° F. This brings about the following reaction:—

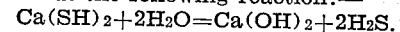
$$Ca(SH)_2 + 2H_2O = Ca(OH)_2 + 2H_2S.$$

Since the converting tank C is open to the air liberated hydrogen sulphide is passed off into the air and sulphur liberated in the liquid and falls to the bottom of the tank. The sulphur hastens or augments the breaking up of the calcium hydrosulphide into calcium hydroxide and hydrogen sulphide. The free sulphur is released from the hydrogen sulphide when the liquid meets air in the tank C. A similar reaction takes place in settling tank D. When the free sulphur accumulates in excess in the bottom of tanks C and D it may be withdrawn by opening the drains 30, 33 to the drain pipe 31.

From the settling tank D the supernatant liquid flows through the pipe 34 into the heat exchanger E where the temperature of the liquid is reduced to substantially the same temperature as the cooling water.

The liquid is then drawn from the heat exchanger through the pipe 44 by the pump P and discharged under pressure through the pipe 45. At this point in the cycle it is necessary to rejuvenate the converted reaction product liquid by adding thereto fresh activating fluid from one of the activating tanks F. This is accomplished by closing valve 47 to the desired degree and opening the valved connections 50, and 51 to the desired degree, so that part of the converted reaction product passes through one of the activating tanks F and picks up activating fluid, so that when it returns to that part of the converted reaction product which was not passed through the activating tank, it will raise this portion of the converted reaction product to the required strength for use in the tower A. As already stated two or more activating tanks F are used so that one of them can be maintained in operation while the other is being charged with the salt solution of calcium hydroxide heretofore described.

The rejuvenated or reactivated converted reaction product liquid passes from the pipe 45 directly to the pipe 12 and from the activating tank to the pipe 12 indirectly by way of the branch pipe 49 for use again in the tower A. There need be no interruption in the continuity of the process, the treating solution being cycled and recycled in the manner described.

The present embodiment of the invention has been disclosed in considerable detail merely for the purpose of exemplification, since in actual practice it attains the features of advantage enumerated as desirable in the statement of the invention and the above description.

It is to be understood that by describing in detail herein any particular form, material, structure, or arrangement, it is not intended to limit the invention beyond the terms of the several claims or the requirements of the prior art.

Having thus described our invention, what we claim as new is:—

A method of removing hydrogen sulphide from natural or other gases comprising contacting the gas with an aqueous solution of sodium chloride containing dissolved calcium hydroxide in a closed receptacle under pressure at least as great as the pressure of the incoming gas, withdrawing the spent treating liquid, passing steam through the same in an open receptacle, cooling the resulting liquid in heat exchange relation to water at atmospheric temperatures and pumping the cooled liquid into fresh aqueous sodium chloride solution containing dissolved calcium hydroxide preparatory to beginning another cycle of operation, then contacting of the gas to be treated with the solution occurring in counter current relation.

GROVER M. FORD.
OTTO H. SCHOENWALD.